United States Patent [19]

Yamada

[11] 4,080,606

[45] Mar. 21, 1978

[54] INK JET PRINTER

[75] Inventor: Takahiro Yamada, Hitachi, Japan

[73] Assignee: Hitachi, Ltd., Japan

[21] Appl. No.: 683,277

[22] Filed: May 5, 1976

[30] Foreign Application Priority Data

May 9, 1975 Japan ................................ 50-54450

[51] Int. Cl.$^2$ ............................................ G01D 15/18

[52] U.S. Cl. ...................................................... 346/75

[58] Field of Search .......................................... 346/75

[56] References Cited

U.S. PATENT DOCUMENTS

| | | | |
|---|---|---|---|
| 3,631,511 | 12/1971 | Keur et al. | 346/75 |
| 3,681,778 | 8/1972 | Keur | 346/75 |
| 3,789,422 | 1/1974 | Haskell et al. | 346/75 |
| 3,828,354 | 8/1974 | Hilton | 346/75 X |
| 3,833,910 | 9/1974 | Chen | 346/75 X |
| 3,981,019 | 9/1976 | Fujimoto et al. | 346/75 |
| 3,984,843 | 10/1976 | Kuhn | 346/75 |

OTHER PUBLICATIONS

Chai, H. D. et al., Charge-Coupled Device for Ink Jet Compensation, IBM Tech. Discl. Bulletin, May 1974, vol. 16, No. 12, pp. 3868-3869.

*Primary Examiner*—George H. Miller, Jr.
*Attorney, Agent, or Firm*—Craig & Antonelli

[57] ABSTRACT

In the case where the synchronism between the timing of generation of ink droplets and the phase of the information signal in an ink jet printer and deflection sensitivity of the droplet are checked by charging certain ink droplets with the phase detection signal voltage or the droplet deflection sensitivity detecting signal voltage, the certain ink droplets appearing at intervals in place of ink droplets for information recording, each of the ink droplets for recording information just following the certain ink droplet experiences distortion in electrification. This invention provides a circuit for compensating the voltage for charging those ink droplets for information recording which just follow the ink droplets for usage excepting information recording, e.g. droplet deflection sensitivity detection or phase detection etc.

11 Claims, 5 Drawing Figures

INK JET PRINTER

BACKGROUND OF THE INVENTION

1. Field of the Invention

This invention relates to an ink jet printer in which ink droplets appearing at intervals in place of the information recording ink droplets are electrified for a purpose other than information recording.

2. Description of the Prior Art

An ink jet printer is disclosed in, for example, the specification of the U.S. Pat. No. 3,596,275 granted to Richard G. Sweet on July 27, 1971. In the printer of this type, the moment the ink column jetted out of the nozzle is split into droplets, the information recording signal voltage is applied to the charging electrode coupled electrostatically to the ink column. Consequently, the ink droplets are charged according to the information recording signal voltage. The charged ink droplets are deflected when they pass between the deflecting electrodes and then the deflected ink droplets adhere to the recording medium to form an ink dot pattern in the desired positions of the medium.

In order to cause the deflected ink droplet to adhere to a desired position of the recording medium, it is necessary to check the deflection sensitivity of a droplet and to control the amount of charge to be given to the droplets and the magnitude of electric field for deflection in response to the result of the checking. In order to charge the ink droplets properly in response to the information recording signal voltage, the tip portion of the ink column must be exactly charged in accordance with the signal voltage the moment the tip portion separates from the column. The proper electrification of the tip portion of the ink column in accordance with the information recording signal voltage needs the synchronism between the phase of creating ink droplets and that of generating the signal voltage. For this purpose, phase control devices have been invented by Robert I. Keur (U.S. Pat. No. 3,681,778) and Takahiro Yamada, U.S. Pat. No. 3,999,188, filed Dec. 2, 1974, entitled "Ink-Jet Recording Apparatus". Namely, in such an ink-jet recording apparatus, ink droplets are sometimes charged by signals for being used for a purpose excepting information recording, and such droplets are sometimes located between the droplets charged by signals for information recording.

It is well known that when a series of ink droplets are charged in accordance with an information recording signal voltage each ink droplet is electrically affected by the just preceeding one and therefore a system has been proposed which compensates the information recording signal voltage for every ink droplet in accordance with the like signal voltage for the just preceeding ink droplet (U.S. Pat. No. 3,631,511 granted to Robert I. Keur et al). In this case, however, a complicated circuit network is needed since the compensation is effected through the measurement of the information recording signal voltage.

SUMMARY OF THE INVENTION

One object of this invention is to prevent the distortion in the charging of the ink droplets for information recording, in an ink jet printer wherein ink droplets appearing at intervals in place of the recording ink droplets are electrified for a purpose other than information recording.

Another object of this invention is to provide an ink jet printer which can attain the above object without resort to any complicated circuit means.

Yet another object of this invention is to prevent the distortion in the electrification of those information recording ink droplets which are just after the ink droplets appearing at intervals in place of the information recording ink droplets and electrified according to the deflection sensitivity detecting signal or the phase detecting signal, in an ink jet printer.

Other object of this invention will be apparent from the following detailed description of this invention.

According to the feature of this invention, the information recording signal, annex signals including the deflection sensitivity detecting signal and the phase detecting signal and the compensation signal provided on the basis of the annex signals as a predetermined signal for compensating distortion of the information recording signal due to the annex signals are all synthesized by an arithmetic amplifier circuit and then the resultant signal is applied to the electrode for charging ink droplets.

DESCRIPTION OF THE PREFERRED EMBODIMENTS

Figure 1:
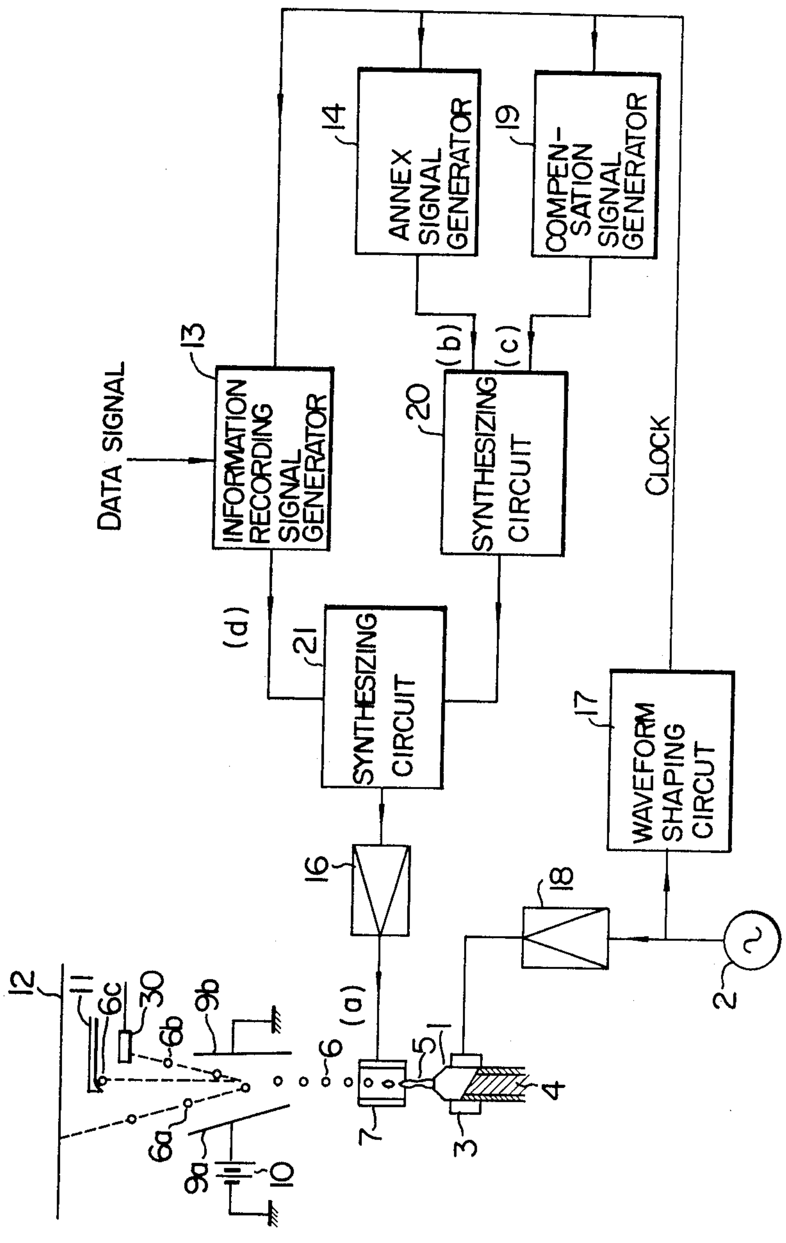
FIG. 1 shows in block diagram an embodiment of this invention.
Figure 2:
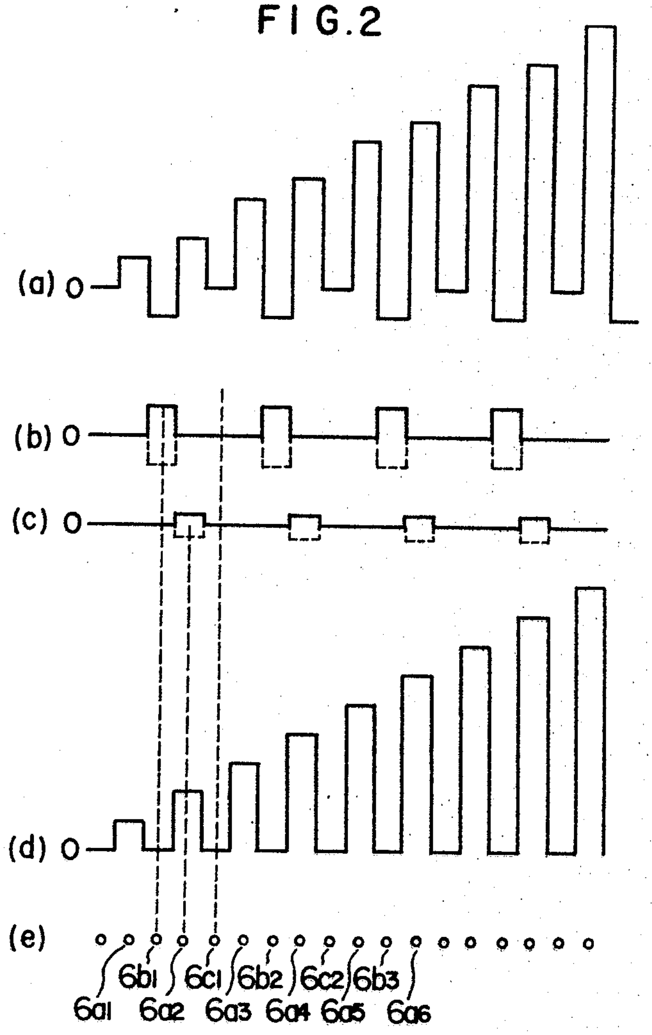
FIG. 2 shows waveforms appearing at various points in the circuit shown in FIG. 1.

As is seen in FIG. 1, the pressured ink 4 is jetted out of a nozzle 1 through its small opening. The nozzle 1 is fitted in an electro-mechanical transducer 3 which is vibrated by the HF voltage applied from a HF power source 2 through an amplifier 18. The ink jetted out of the nozzle 1 forms an ink column 5 near the tip of the nozzle 1 and the ink column 5 is regularly split into ink droplets 6 by the vibration generated by the transducer 3. A charging electrode 7 is disposed near the tip of the nozzle 1 to surround the top of the ink column 5. Accordingly, there exists an electrostatic capacitance between the ink column 5 and the charging electrode 7. If a voltage is applied to the charging electrode 7, electric charges are induced in the ink column 5. Under this condition, an ink droplet 6 separated from the ink column 5 remains charged in proportion to the amplitude of the voltage applied to the charging electrode 7. When the charged ink droplet 6 flying toward a recording medium 12 passes between deflecting electrodes **9*a* and 9*b*, it is deflected by the electrostatic force acting thereon. If the droplet 6 is negatively charged and if the deflecting electrodes 9*a* and 9*b* are respectively connected with the positive pole of a high dc voltage source 10 and grounded, then the negatively charged droplet 6 is bent toward the deflecting electrode 9*a*. The ink droplet 6 which is not charged is not deflected and flies straight toward a gutter 11. The gutter 11 collects the uncharged ink droplets for the purpose of reuse. On the other hand, the positively charged ink droplet 6 is bent toward the deflecting electrode 9*b* and collides with a detector 30. The detector 30 is so located that the ink droplet charged by the signal voltage for phase detection or deflection sensitivity detection may hit it. The relationship in phase between the generation of the ink droplets or deflection sensitivity and the information recording signal voltage is checked on the basis of the output of the detector 30. An information recording signal generator 13, an annex signal generator 14 and a compensation signal generator 19** generate respectively an information recording signal (*d*), an annex signal (*b*) for deflection sensitivity detecting and phase detecting etc. and a compensation signal (*c*) (diagrams (*d*), (*b*) and (*c*) in FIG. 2 for the case of that the annex signal is used for detection of deflection sensitivity) in response to the clock signal sent from the HF power source 2 through a waveform shaping circuit 17. The annex signal (*b*) and the compensation signal (*c*) are synthesized by a first synthesizing circuit 20. The output of the first synthesizing circuit 20 and the information recording signal (*d*) is synthesized by a second synthesizing circuit 21 and the output of the second synthesizer 21 is applied through an inverting amplifier 16 as a signal (*a*) to the charging electrode 7. The relationships of the timing of generation of ink droplets to the signal voltages (*a*), (*b*), (*c*) and (*d*) are as shown in FIG. 2. In FIG. 2, the ink droplets $6a_1$, $6a_2$, $6a_3$, $6a_4$, ..... are for information recording, the droplets $6a_2$ and $6a_4$ being compensated in charging according to the compensation signal. The droplets $6b_1$ and $6b_2$ are droplets used for the purpose excepting information recording and charged by annex signals for deflection sensitivity detecting and phase detecting etc. and the droplets $6c_1$ and $6c_2$ are not charged and are collected by the gutter 11.

Figure 3:
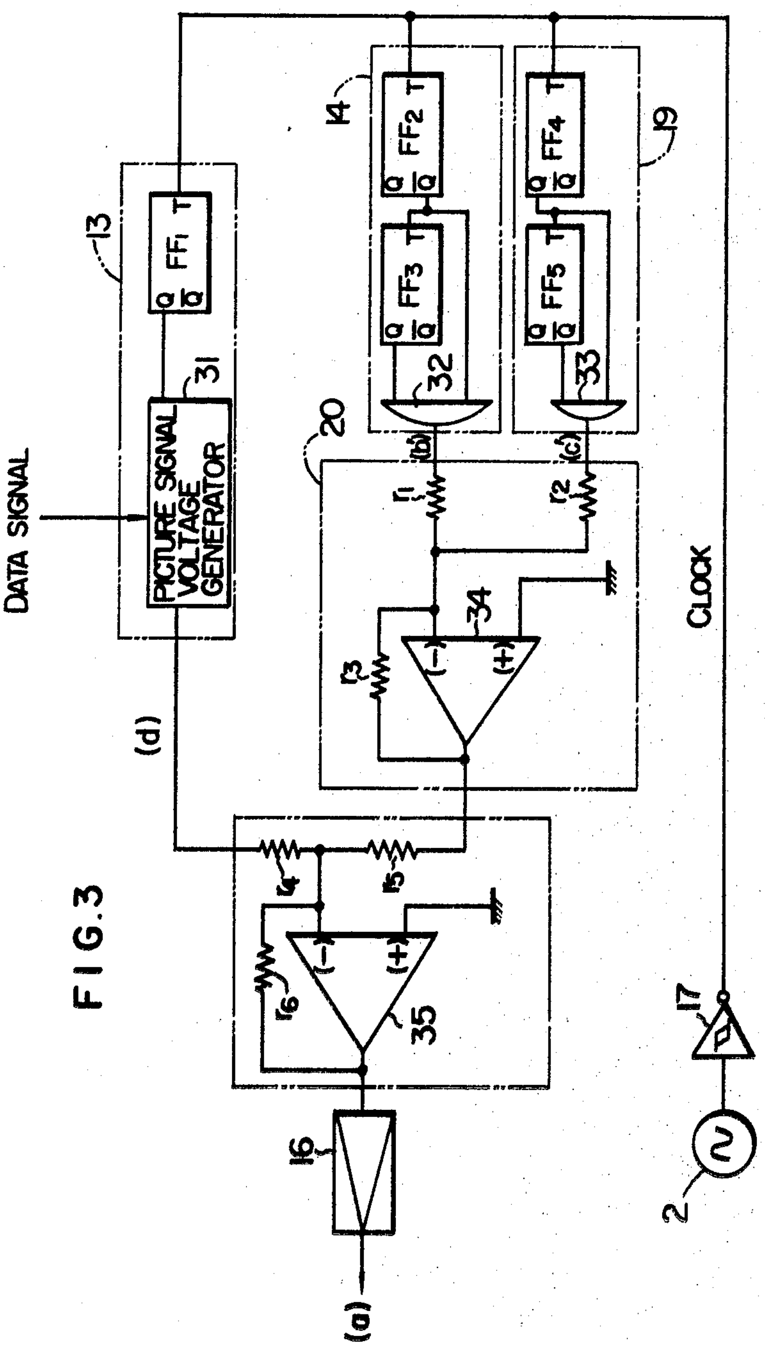
FIG. 3 is a detailed version of FIG. 1, with a part omitted.

FIG. 3 shows in further detail the electric circuit shown in FIG. 2, as an example where the annex signal is used for deflection sensitivity detecting. The information recording signal generator 13 consists of a flip-flop $FF_1$ and a picture signal voltage generator 31 and the picture signal voltage generator 31 generates the information recording signal (*d*) on the basis of a data signal. The information recording signal (*d*) is generated in timing with the Q output of the $FF_1$ actuated by the clock signal sent from the HF power source 2 via the Schmitt circuit 17. The deflection sensitivity detecting (annex) signal generator 14 consists of flip-flops $FF_2$ and $FF_3$ and an AND gate 32. The compensation signal generator 19 consists of flip-flops $FF_4$ and $FF_5$ and an AND gate 33. The phase of the output of the AND gate 33 lags that of the output of the AND gate 32 by a single cycle. The first synthesizer 20 is constituted of an operational amplifier 34, input resistors $r_1$ and $r_2$ and a feedback resistor $r_3$. The outputs $(b)'$ and $(c)'$ of the AND gates 32 and 33 are applied to the negative input terminal of the operational amplifier 34 through the resistors $r_1$ and $r_2$. The second synthesizer 21 is composed of an operational amplifier 35, resistors $r_4$ and $r_5$ and a feedback resistor $r_6$. The output of the operational amplifier 34 and the information recording signal (*d*) are applied to the negative input terminals of the operational amplifier 35 via the respective resistors $r_4$ and $r_5$. The positive input terminals of the operational amplifiers 34 and 35 are both grounded.

With this constitution, the output of the AND gate 32 is adjusted to a predetermined value through the resistor $r_1$. The level-adjusted output becomes the signal (*b*) and is sent through the operational amplifier 34, the resistor $r_5$, the operational amplifier 35 and the amplifier 16 to the charging electrode 7 to charge the ink droplets $6b_1$ and $6b_2$ (see diagram (*e*) in FIG. 2). The degrees of charging the ink droplets $6a_2$ and $6a_4$ which come respectively just after the ink droplets $6b_1$ and $6b_2$ and are charged in accordance with the information recording signal (*d*), are affected by the charges on the ink droplets $6b_1$ and $6b_2$. According to this invention, in order to compensate for the influence, the compensation signal is delivered from the AND gate 33 in parallel with the deflection sensitivity detecting signal (or annex signal). The output of the AND gate becomes a compensation signal adjusted to have a predetermined level suitable for cancelling the influence, through the resistor $r_2$. The level-adjusted output serves as the compensation signal (*c*) and is applied through the operational amplifier 34 and the resistor $r_5$ to the operational amplifier 35. At the same time, the information recording signal (*d*) is also applied through the resistor $r_4$ to the operational amplifier 35. The information recording signal (*d*), the droplet deflection sensitivity detecting signal (*b*) (or annex signal) and the compensation signal (*c*) respectively have positive, negative and negative polarities with respect to the input terminal of the operational amplifier 35.

Figures 4, 5:
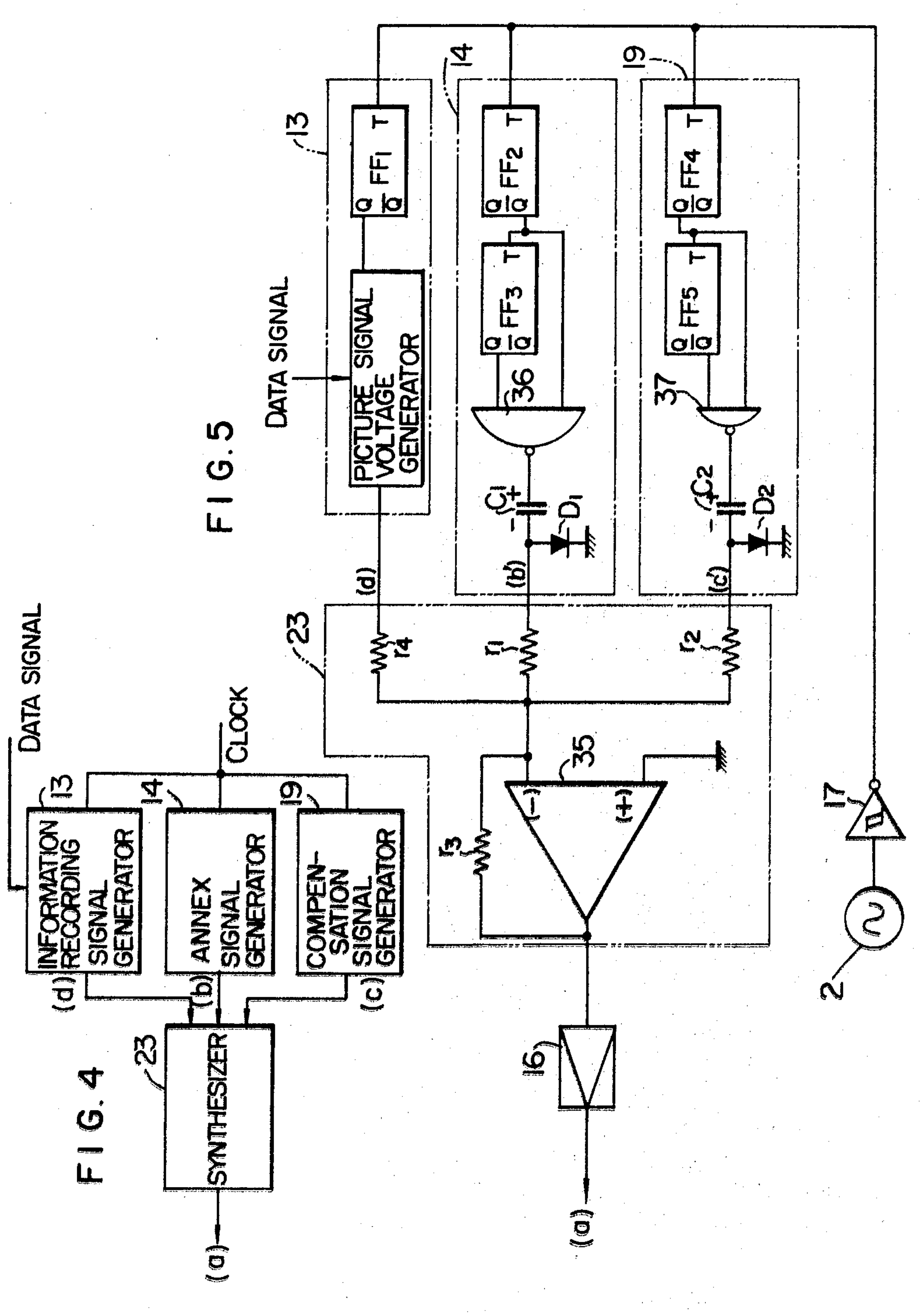
FIG. 4 shows in block diagram another embodiment of this invention.
FIG. 5 is a detailed version of FIG. 4.

FIG. 4 shows in block diagram another embodiment of this invention, in which the outputs of the generators 13, 14 and 19 are synthesized by a synthesizer 23. FIG. 5 shows in further detail the circuit shown in FIG. 4. The difference of FIG. 3 from FIG. 5 are as follows. Namely, the AND gates 32 and 33 are replaced by NAND gates 36 and 37; clamping circuit including capacitors $C_1$ and $C_2$ and diodes $D_1$ and $D_2$ is incorporated so as to make the poralities of the deflection sensitivity detecting signal (*b*) (or annex signal) and the compensation signal (*c*) opposite to that of the information recording signal (*d*); and the first synthesizer 20 is omitted, with the resistors $r_1$, $r_2$ and $r_3$ connected with the negative input terminal of the operational amplifier 35. Accordingly, unless either of the deflection sensitivity detecting signal and the compensation signal is not generated, the NAND gates 36 and 37 deliver outputs of high level so that the capacitors $C_1$ and $C_2$ are charged as indicated in FIG. 5. If the annex signal or the compensation signal is generated, the NAND gates deliver outputs of low level so that the voltages of negative polarity at the capacitors $C_1$ and $C_2$ are applied through the resistors $r_1$ and $r_2$ to the operational amplifier 35. In the case where the information recording signal (*d*) is of negative polarity, those inverting means are not necessary and AND gates can be used in that case as in FIG. 3.

I claim:

1. An ink jet printer comprising a means for jetting pressured ink out of a nozzle to produce ink droplets flying toward a recording medium; an electro-mechanical vibrating element for vibrating said nozzle to regularly separate said ink droplets; a HF power source for energizing said electro-mechanical vibrating element; a charging electrode for charging said ink droplets; deflecting electrodes for establishing a deflecting electric field in the flight path of said ink particles; an information recording signal generator for generating an information recording signal voltage in response to a clock signal generated on the basis of the output of said HF power source; an annex signal generator for generating an annex signal voltage for a droplet deflection sensitivity detecting signal and a phase detecting signal in response to said clock signal; a compensation signal generator for generating a predetermined compensation signal for cancelling the influence given to the charge of information recording ink droplets due to charging ink droplets by the annex signal voltage on the basis of said clock signal, in parallel with said annex signal, and a circuit means having at least a synthesizing circuit for synthesizing the outputs of said three generators and applying the synthesized output to said charging electrode.

2. An ink jet printer as claimed in claim 1, wherein said compensation signal is located at the position following the annex signal voltage and has the same polarity to as that of said annex signal.

3. An ink jet printer as claimed in claim 1, wherein said synthesizing circuit includes an operational amplifier, the input terminal of said operational amplifier is connected through respective resistors with said information recording signal generator, said annex signal generator and said compensation signal generator.

4. An ink jet printer as claimed in claim 1, wherein said synthesizing circuit means comprises a first synthesizing circuit for synthesizing said annex signal and said compensation signal and a second synthesizing circuit for synthesizing the output of said first synthesizing circuit and said information recording signal.

5. An ink jet printer as claimed in claim 1, wherein said information recording signal generator has a flip-flop in said clock signal circuit, said annex signal generator having two flip-flops connected to said clock signal circuit in series, and said compensation signal generator having two flip-flops connected to said clock signal circuit in series.

6. An ink jet printer comprising:

means for jetting pressured ink out of a nozzle to produce ink droplets flying toward a recording medium;

an electro-mechanical vibrating element for vibrating said nozzle to regularly separate said ink droplets;

an HF power source for energizing said electro-mechanical vibrating element;

a charging electrode for charging said ink droplets;

deflecting electrodes for establishing a deflecting electric field in the flight path of said ink droplets; and a clock signal circuit connected to said HF power source;

wherein there is provided an information recording signal generator for generating an information recording signal voltage in response to a clock signal produced by said clock signal circuit in order to charge each ink droplet spaced with a predetermined interval with an electric charge according to a deflection amount for information recording;

an annex signal generator for generating an annex signal voltage with a predetermined value in response to the clock signal of said clock signal circuit in order to provide a constant electric charge corresponding to a deflection amount for a droplet deflection sensitivity detecting signal and a phase detecting signal with a predetermined cycle to droplets located between the ink droplets for information recording;

a compensation signal generator connected to said clock signal circuit for generating a predetermined compensation signal with an amount for cancelling the influence given to the charge of information recording ink droplets due to charging ink droplets by the ink droplets charged by the annex signal voltage, and with the same cycle and phase as the annex signal and the information recording signal, respectively; and circuit means having at least a synthesizing circuit for synthesizing the outputs of said three generator circuits and applying the synthesized output to said charging electrodes.

7. An ink jet printer comprising:

means for jetting pressured ink out of a nozzle to produce ink droplets flying toward a recording medium;

an electrode-mechanical vibrating element for vibrating said nozzle to regularly separate said ink droplets;

an HF power source for energizing said electro-mechanical vibrating element;

a charging electrode for charging said ink droplets;

deflecting electrodes for establishing a deflecting electric field in the flight path of said ink droplets; and a clock signal circuit connected to said HF power source;

wherein there is provided an information recording signal generator for generating an information recording signal voltage in response to a clock signal produced by said clock signal circuit in order to charge each ink droplet arranged alternately with an electric charge according to a deflection amount for information recording;

an annex signal generator for generating an annex signal voltage with a predetermined value in response to the clock signal of said clock signal circuit in order to provide a predetermined electric charge corresponding to a deflection amount for a droplet deflection sensitivity detecting signal and a phase detecting signal with a predetermined cycle of droplets located between the ink droplets for information recording;

a compensation signal generator connected to said clock signal circuit for generating a predetermined compensation signal with an amount for cancelling the influence given to the charge of information recording ink droplets due to charging ink droplets by the ink droplets charged by the annex signal voltage, and with the same cycle as the annex signal and with the same phase as the information recording signal following the ink droplet charged on the basis of the annex signal; and circuit means having at least a synthesizing circuit for synthesizing the outputs of said three generator circuits and applying the synthesized output to said charging electrode.

8. An ink jet printer as claimed in claim 7, wherein said information recording signal generator has a flip-flop connected between said clock signal circuit and said information recording signal generator, said annex signal generator having two flip-flops connected in series between said clock signal circuit and said annex signal generator, and said compensation signal generator.

9. An ink jet printer as claimed in claim 8, wherein the flip-flops connected in said annex signal generator are arranged such that the input terminal of the flip-flop at a rear stage is connected to the output terminal $\overline{Q}$ of the flip-flop at a front stage, and the flip-flops connected in said compensation signal generator are arranged such that the input terminal of the flip-flop at a rear stage is connected to the output terminal Q of the flip-flop at a front stage.

10. An ink jet printer comprising:

means for jetting pressured ink out of a nozzle to produce a series of ink droplets flying toward a recording medium;

an electro-mechanical vibrating element for vibrating said nozzle to regularly separate said ink droplets;

an HF power source for energizing said electro-mechanical vibrating element;

a charging electrode for charging said ink droplets;

deflecting electrodes for establishing a deflecting electric field in the flight path of said ink particles;

an information recording signal generator for generating an information recording signal voltage, in response to a clock signal generated on the basis of the output of said HF power source to be coupled to said charging electrode so as to impart an electric charge to each $(2n-1)$th ink droplet in said series of droplets which is representative of information to be recorded on said recording medium, where $n$ is an integer greater than zero;

an annex signal generator for generating an annex signal voltage, for a droplet deflection sensitivity detecting signal and a phase detecting signal in response to said clock signal, to be coupled to said charging electrode so as to impart an electric charge to each $(4n-2)$th droplet in said series of droplets;

a compensation signal generator for generating a predetermined compensation signal voltage, for cancelling the influence given to the charge of information recording ink droplets due to charging each $(4n-2)$th ink droplet by the annex signal voltage on the basis of said clock signal, to be coupled to said charging electrode so as to impart a compensating electric charge to each $(4n-1)$th droplet in said series of droplets; and means for combining the respective signal voltages generated by said information recording signal generator, said annex signal generator and said compensation signal generator and applying the resulting signal voltage to said charging electrode.

11. An ink jet printer according to claim 10, where the polarity of the charge imparted to respective ink droplets by said annex signal generator and by said compensation signal generator is opposite to the polarity of the charge imparted to a respective ink droplet by said information recording signal generator.

* * * * *